US008085265B2

(12) United States Patent
Chen et al.

(10) Patent No.: US 8,085,265 B2
(45) Date of Patent: Dec. 27, 2011

(54) METHODS AND SYSTEMS OF GENERATING 3D USER INTERFACE FOR PHYSICAL ENVIRONMENT

(75) Inventors: Henry Chen, Beijing (CN); Ji Gu, Shanghai (CN); Cheng Jun Li, Beijing (CN); Yajun-Edwin Zhang, Shanghai (CN); John R. Hajdukiewicz, Florham Park, NJ (US); Tom Plocher, Hugo, MN (US)

(73) Assignee: Honeywell International Inc., Morristown, NJ (US)

( * ) Notice: Subject to any disclaimer, the term of this patent is extended or adjusted under 35 U.S.C. 154(b) by 909 days.

(21) Appl. No.: 12/108,467

(22) Filed: Apr. 23, 2008

(65) Prior Publication Data

US 2009/0271365 A1 Oct. 29, 2009

(51) Int. Cl.
*G06T 15/00* (2006.01)
(52) U.S. Cl. ......... 345/419; 709/227; 709/228; 709/229
(58) Field of Classification Search .................. 345/419; 709/227, 228, 229
See application file for complete search history.

(56) References Cited

U.S. PATENT DOCUMENTS

| 7,073,059 | B2 * | 7/2006 | Worely et al. ................. 713/168 |
| 7,899,915 | B2 * | 3/2011 | Reisman ........................ 709/228 |
| 2006/0164409 | A1 | 7/2006 | Borchardt et al. |
| 2006/0274060 | A1 | 12/2006 | Ni et al. |
| 2007/0070066 | A1 | 3/2007 | Bakhash |
| 2007/0094600 | A1 | 4/2007 | Sullivan et al. |

OTHER PUBLICATIONS

"User-Controlled VRML Simulation of an Excavator, Tower Crane, and Dumptruck", http://cic.nist.gov/vrml/equip.html, (Oct. 23, 2006).
"Web 3D Consortium", http://www.web3d.org, (Downloaded Feb. 29, 2008).
Bell, Blaine, et al., "View Management for Virtual and Augmented Reality", *Proceedings of the 14th Annual ACM Symposium on User Interface Software and Technology*, (2001),101-110.
Capell, Steve, et al., "Interactive skeleton-driven dynamic deformations", *ACM Transactions on Graphics*, 21(3), (2002),586-593.
Dachselt, Raimund, et al., "Three-dimensional menus: A survey and taxonomy", *Computers & Graphics*, 31(1), (Jan. 2007),53-65.
Gajos, Krzysztof, et al., "Supple: automatically generating user interfaces", *Proceedings of the 9th International Conference on Intelligent User Interfaces*, (2004),93-100.
James, D., et al., "Skinning mesh animations", *ACM Transactions on Graphics*, 24(3), (Aug. 2005),399-407.

(Continued)

*Primary Examiner* — Phu Nguyen
(74) *Attorney, Agent, or Firm* — Schwegman, Lundberg & Woessner P.A.

(57) ABSTRACT

One embodiment of the application provides a method of generating a 3D user interface (UI) in a controller for an appliance in a physical environment. The method includes: abstracting the appliance to obtain to a appliance functionality description having variables of the appliance, operations of the state variables, and relationship among the state variables; converting the state variables into corresponding 3D widgets in the controller, wherein the state variable are mapped respectively into the 3D widgets; laying out the 3D widgets to form the 3D UI in the controller; constructing communication objects in the controller from the state variables, the state variables being mapped into the communication objects; and providing interaction between the 3D UI and the appliance by a communication protocol integrated with the appliance.

20 Claims, 5 Drawing Sheets

OTHER PUBLICATIONS

Lee, Wai L., et al., "Automatic layout for 3D user interfaces construction", *Proceedings of the 2006 ACM International Conference on Virtual Reality Continuum and its Applications*, (2006),113-120.

Nichols, Jeffrey, et al., "Generating remote control interfaces for complex appliances", *Proceedings of the 15th Annual ACM Symposium on User Interface Software and Technology*, (2002),161-170.

Nichols, Jeffrey, et al., "Uniform: automatically generating consistent remote control user interfaces", *Proceedings of the SIGCHI Conference on Human Factors in Computing Systems*, (2006),611-620.

Satyanarayanan, M., "Pervasive computing: vision and challenges", *Personal Communications, IEEE [see also IEEE Wireless Communications]*, 8(4), (Aug. 2001),10-17.

Weiser, Mark, "The Computer for the Twenty-First Century", *Scientific American* 265(3), (Sep. 1991),94-104.

\* cited by examiner

| Temperature | Type: Integer | |
| --- | --- | --- |
| | Range : [10, 30] | |
| | Default: 20 | |
| Fan | Type: Enum | |
| | Range: [1, 2, 3] | |
| | Default: 1 | |

*FIG. 8*

METHODS AND SYSTEMS OF GENERATING 3D USER INTERFACE FOR PHYSICAL ENVIRONMENT

TECHNICAL FIELD

Various embodiments described herein relate generally to data visualization, such as methods and systems for generating user interfaces.

BACKGROUND

With the development of computer technology, the physical environment of living or working is increasingly equipped with various appliances, such as HVACs, light switches and sensors, which can be connected via a network to a control center. In the control center, an administrator can monitor and control various appliances located in each room within an intelligent building by using 3D (three-dimensional) based interaction applications, such as 3D user interfaces, which are increasingly used in various domains because of their immersion and immediacy of visualization. Compared with 2D user interfaces, 3D user interfaces provide more immersive effects and intuitive interactions.

However, it is a challenging task to efficiently generate and reuse 3D user interfaces, and to effectively associate their behaviors or animations to a user's interactions.

BRIEF DESCRIPTION OF THE DRAWINGS

Some embodiments are illustrated by way of examples, and not by way of limitations, in the figures of the accompanying drawings in which.

DETAILED DESCRIPTION

In the following description, for purposes of explanation, numerous specific details are set forth in order to provide a thorough understanding of example embodiments. It will be evident, however, to one skilled in the art that the embodiments of the application may be practiced without these specific details.

The present application describes various systems and methods of generating a three dimensional (3D) user interface (UI) in a controller for an appliance in a physical environment. The present application also describes various methods of laying out a 3D UI in a controller for an appliance in a physical environment. The term "controller" used in the application denotes a "display device", which includes 3D virtual devices (e.g., a virtual bulb) and related 3D widgets (e.g., a virtual power switch of the bulb) corresponding to appliances (e.g., a real bulb) in a physical environment, and thus permits users to monitor and interact with the appliances in the physical environment via these 3D virtual devices and related 3D widgets presented in a user interface of the display device.

Figure 1:
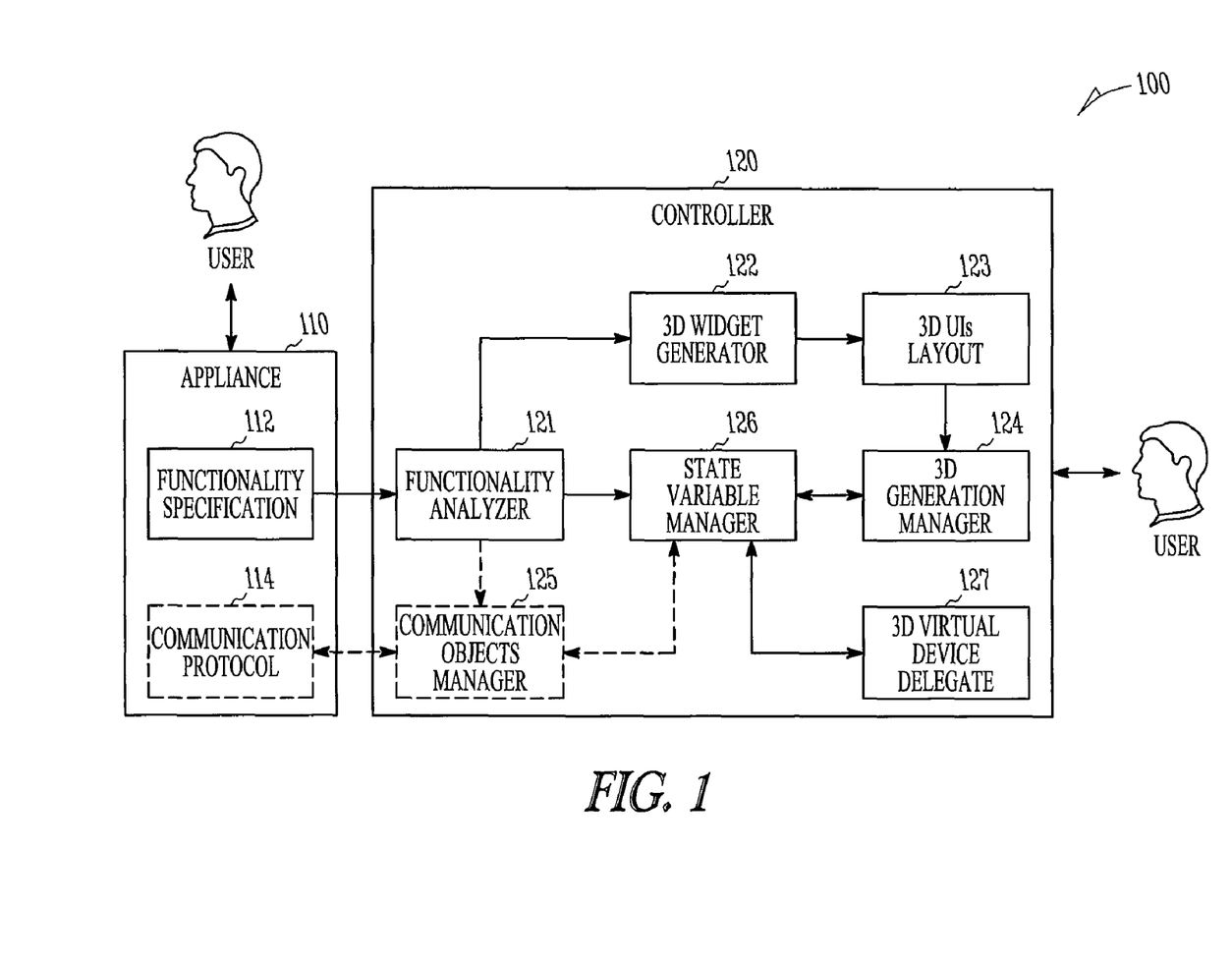
FIG. 1 is a block diagram illustrating an example system of automatically generating a 3D user interface for an appliance in a physical environment according to an example embodiment.

FIG. 1 illustrates an example system 100 of generating a 3D user interface for an appliance 110 in a physical environment according to an example embodiment. The system 100 includes a functionality specification 112, which is abstracted from the appliance 110, and a controller 120 coupled to the appliance. The appliance 110 can be any artifacts, such as variety of sensors, installed in a physical environment.

Figure 2:
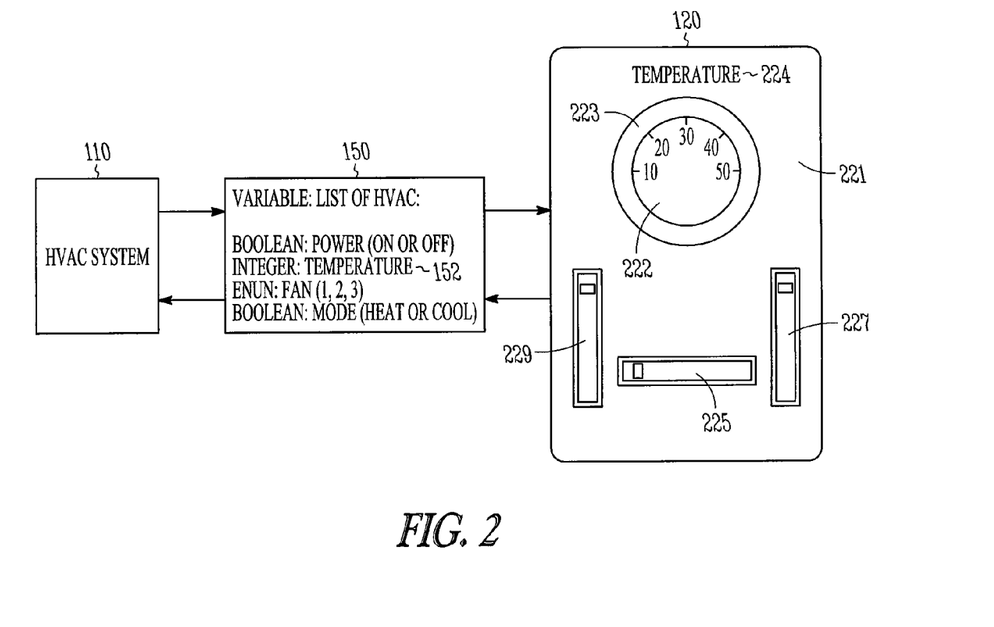
FIG. 2 is a block diagram illustrating a mapping between functionalities of an appliance in a physical environment and widgets of a 3D user interface in a controller according to an example embodiment.

FIG. 2 illustrates a mapping between functionalities of an HVAC system 110 in a physical environment and widgets (221, 225, 227 and 229) of a 3D user interface in a controller 120 according to an example embodiment.

As shown in FIGS. 1 and 2, the controller 120 may include: a functionality analyzer 121 to analyze the functionality specification 112 to extract state variables (e.g., an integer showing a setting temperature) of an appliance 110 (e.g., HVAC system 110), operations of the state variables, and relationships among the state variables; a 3D UI generation module 122 to automatically convert the state variables into corresponding 3D widgets (e.g., a virtual knob 221 with a pointer indicating the setting temperature of the HVAC system 110, FIG. 2); a 3D UI layout module 123 to layout the 3D widgets (e.g., the virtual knob 221, virtual bars 225, 227 and 229 respectively indicating power (on/off), fan speed levels (1, 2, 3) and working mode (heat/cool) of the HVAC system 110); and a 3D UI generation module 124 to generate a 3D UI related to the appliance 110 by using the 3D widgets.

A model-driven 3D geometric modeling system may be used as the 3D UI generation module to convert state variables of a physical appliance into 3D widgets. For example, the model-driven 3D geometric modeling system may abstract basic geometric elements, state variables, and basic geometric operators of a physical appliance. For each different domain, a domain model is defined and built by domain experts based on the basic geometric elements, state variables, and basic geometric operators. Each domain corresponds to a different type or field, for example, large buildings, campus, or industry control. Different domain may have different domain elements. For example, the domain of industry control may have domain elements or 3D widgets, such as HVACs, temperature sensors, reactors, pipes, valves, pumps, splitters, and etc. The domain model of a domain describes rules for identifying domain elements and rules for generating a 3D geometric model from these domain elements and state variables for the specific domain. For example, in order to generate a 3D geometric model for a domain, first, the basic state variables can be extracted from an input source with known geometric computation technology, digital image processing technology, and pattern recognition technology. Then, the basic state variables can be converted into domain elements (or 3D widgets) according to the rules for identifying domain elements, which have been described in the domain model. After that, geometric operators can be used to construct the 3D geometric model of the specific domain from the domain elements according to the rules for generating a 3D geometric model. The 3D geometric model may include many 3D geometric objects.

In some embodiments, the controller 120 may also include a communication object manager 125 to construct communication objects (not shown) from the state variables, in which the state variables are mapped into the communication objects.

In some embodiments, a communication protocol 114 is integrated with the appliance 110 to provide interaction between the 3D UI in the controller 120 and the appliance in the physical environment via the constructed communication objects.

In some embodiments, the controller 120 further includes a state variable manager 126 to capture any interaction of a user 140 (e.g., an administrator in a control room of an intelligent building) with the generated 3D widgets, and to update the state variables by the operations thereof. In addition, the state variable manager 127 may also capture any update of the communication objects caused by an action to the appliance applied by a user 130 (e.g., a person in an individual room), and to update the state variables by the operations thereof. For example, the controller 120 may capture the interaction with 3D widgets, update the values of the variables via their operations, and maintain the states of these variables (or functions) of the appliance, so as to adjust the related virtual object in the 3D scene when necessary (e.g., when the variable are updated) in real time.

In some embodiments, the controller 120 further includes a 3D virtual device delegate module 127 to capture any update of the state variables of the appliance (e.g., the HVAC system 110) and in turn to update a corresponding 3D virtual device (not shown), which illustrates a 3D image of the HVAC system 110 in the controller 120 so that users may have an intuitive view of the physical environment.

Further referring to FIG. 2, for example, an integer Temperature variable 152 from the Variable List 150 of the HVAC system 110 may be converted into a widget (e.g., a knob 221), which may comprise three components: an interactive component 222 (e.g., an adjustable part of the knob 221), through which a user may adjust the temperature of the HVAC system 110), a dock component 223 to hold the interactive component 222, and a text annotation (e.g., a marking "temperature") 224 to form a background of the interactive component 222 to specify an action of the interactive component 222.

In some example embodiments, an appliance in the physical environment is abstracted to form a model, which abstracts the functions of the appliance, including a set of state variables, the corresponding operations of the set of variables and the relationship among them. Based on the model, developers may design the specification to describe functions of the model. For example, two variables may be abstracted from a door. One variable is a Boolean variable "DoorState (open or close)" with corresponding operation "SetDoorState (Boolean state)", and the other variable is an integer variable "OpenAngle" with corresponding operation SetAngle (int angle). The relationship between these two variables is that the "OpenAngle is "disabled" if the variable DoorState is "closed".

Regarding a model-based UI, the interface may expose its functions to its users. For example, the appliance's functions can be represented into a set of state variables and their corresponding operations. In addition, the state variables of an appliance may affect each other, which may be abstracted as relationship among them. Consequently, an appliance may be modeled as the following equation:

$$F=<S,O,R>$$

Here S is a set of state variables. Each state variable in S can have a particular type, and can be represented a concrete interface. Further, it can be added some constraints to confine its legal value range. $R=S^+=\{S,S\times S,S\times S\times S, \ldots \}$ is a set of relationship among state variables. R reflects the facts that a state variable may affect other state variables. O is a set of operations. An operation should define its related state variable. An operation should advertise how to access it.

Referring again to FIG. 2, the HVAC system 110 has four functionalities: Power (on/off), Temperature, Fan Speed, and Operating Mode (heat/cool). Thus, the HVAC can be modeled as the following Table 1:

TABLE 1

| State Variable | Type | Operation |
|---|---|---|
| Power | Boolean[ON, OFF] | SetPower(Enum power) |
| Temperature | Integer | SetTemp(int temp) |
| FanSpeed | Enum[1, 2, 3] | SetFanSpeed(Enum speed) |
| OperatingMode | Boolean[Heat, Cool] | SetMode(Enum mode) |

Figure 3:
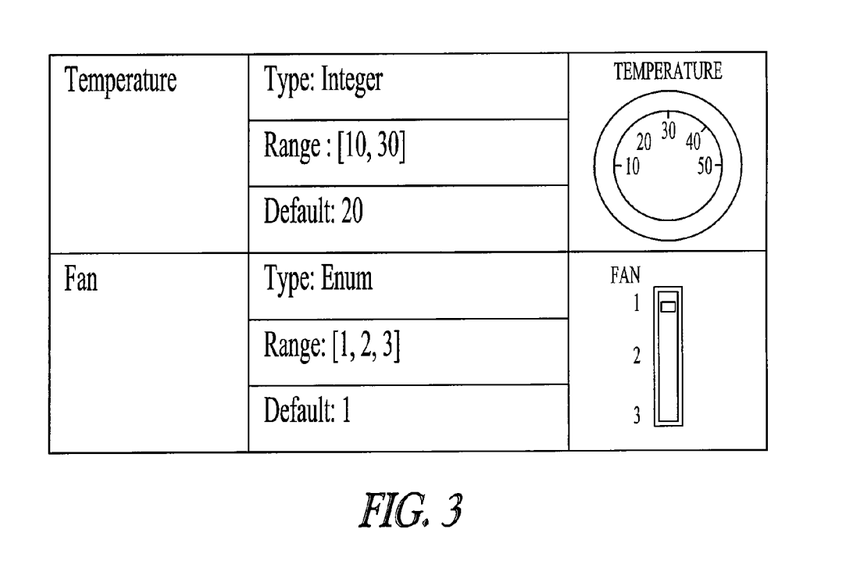
FIG. 3 is a diagram illustrating a mapping of state variables of an appliance in a physical environment into corresponding 3D widgets of a 3D user interface in a controller according to an example embodiment.

Ration:
if Power = OFF, the Temperature = Disable
if Power = OFF, the FanSpeed = Disable
if Power = OFF, the OperatingMode = Disable FIG. 3 illustrates an example mapping of state variables of the HVAC system 110 of FIG. 2 into corresponding 3D widgets. When defining the state variables of an appliance 110, a developer should set their default values and valid value ranges. For example, regarding the "Temperature" variable of the HVAC system 110, the type is set as "Integer", the range is set as "from 10 to 30", and the default value is set "20". In another example, regarding the "Fan" variable of the HVAC system 110, the type is set as "Enum", the range is set as "1, 2, or 3", and the default value is set as "1". With these settings of the state variables, for example, the state variables Temperature and Fan of the HVAC system 110 can be converted into 3D Temperature and Fan widgets as shown in FIG. 3 by using 3D geometric modeling method.

Figure 4:
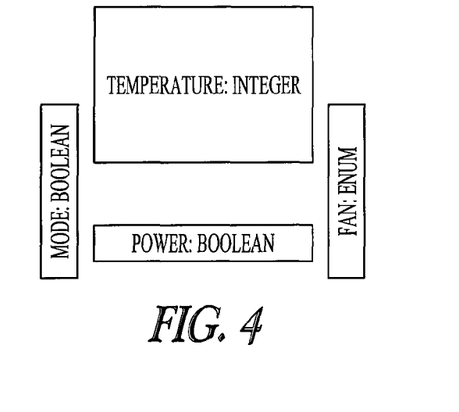
FIG. 4 is a diagram illustrating a layout of widgets according to an example embodiment.

FIG. 4 illustrates an example layout of the widgets corresponding to the Temperature, Power, Fan, and Mode state variables of the HVAC system 110 as shown in FIG. 2.

Figure 5:
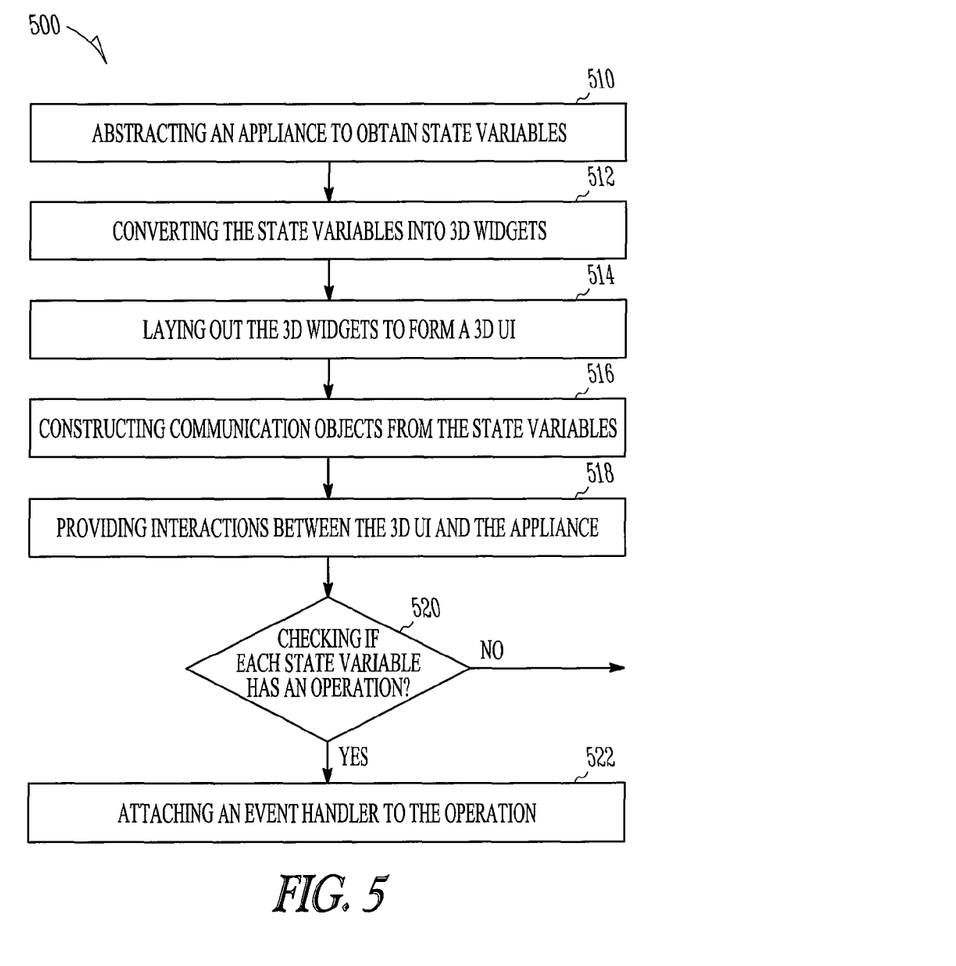
FIG. 5 is a diagram illustrating various methods of generating a 3D user interface in a controller for an appliance in a physical environment according to an example embodiment.

FIG. 5 illustrates various methods 500 of generating a 3D user interface in a controller for an appliance in a physical environment according to an example embodiment.

For example, at block 510, the appliance is abstracted to obtain an appliance functionality description. The appliance functionality description includes information on state variables of the appliance, operations of the state variables (in some cases), and relationship among the state variables.

At block 512, the abstracted state variables are respectively converted into 3D widgets to be displayed in the controller. The state variables are mapped respectively into the converted 3D widgets. At block 514, the 3D widgets are laid out to form a 3D UI in the controller.

At block 516, communication objects are respectively constructed from the state variables of the appliance in the controller. The state variables are mapped into the communication objects. At block 518, interactions between the 3D UI and the appliance are provided via a communication protocol integrated with the appliance.

At block 520, each state variable is checked to determine whether the state variable has an operation. If yes, at block

522, an event handler is attached to the operation to deal with any corresponding interactions.

With the generated UI, when an operation is applied to a widget in the generated 3D UI of the controller, the state variable of the appliance is updated, in turn the corresponding communication object is updated, and thus finally an action on the appliance is activated in the physical environment via the communication protocol. Vice versa, when an action is applied to the appliance in the physical environment, the communication object is updated via the communication protocol, in turn the corresponding state variable of the appliance is updated, and thus finally an operation on the corresponding 3D widget is presented in the controller.

For example, by turning the generated virtual temperature knob 221 in FIG. 2, the temperature of the HVAC system 110 is updated in the controller, in turn the corresponding communication object in the controller is updated, and thus finally an actual temperature adjustment of the HVAC system 110 in the physical environment is activated via the communication protocol 114 integrated in the appliance 110. Vice versa, a temperature adjustment action applied to the HVAC 110 can be presented in the controller 120.

Figure 6:
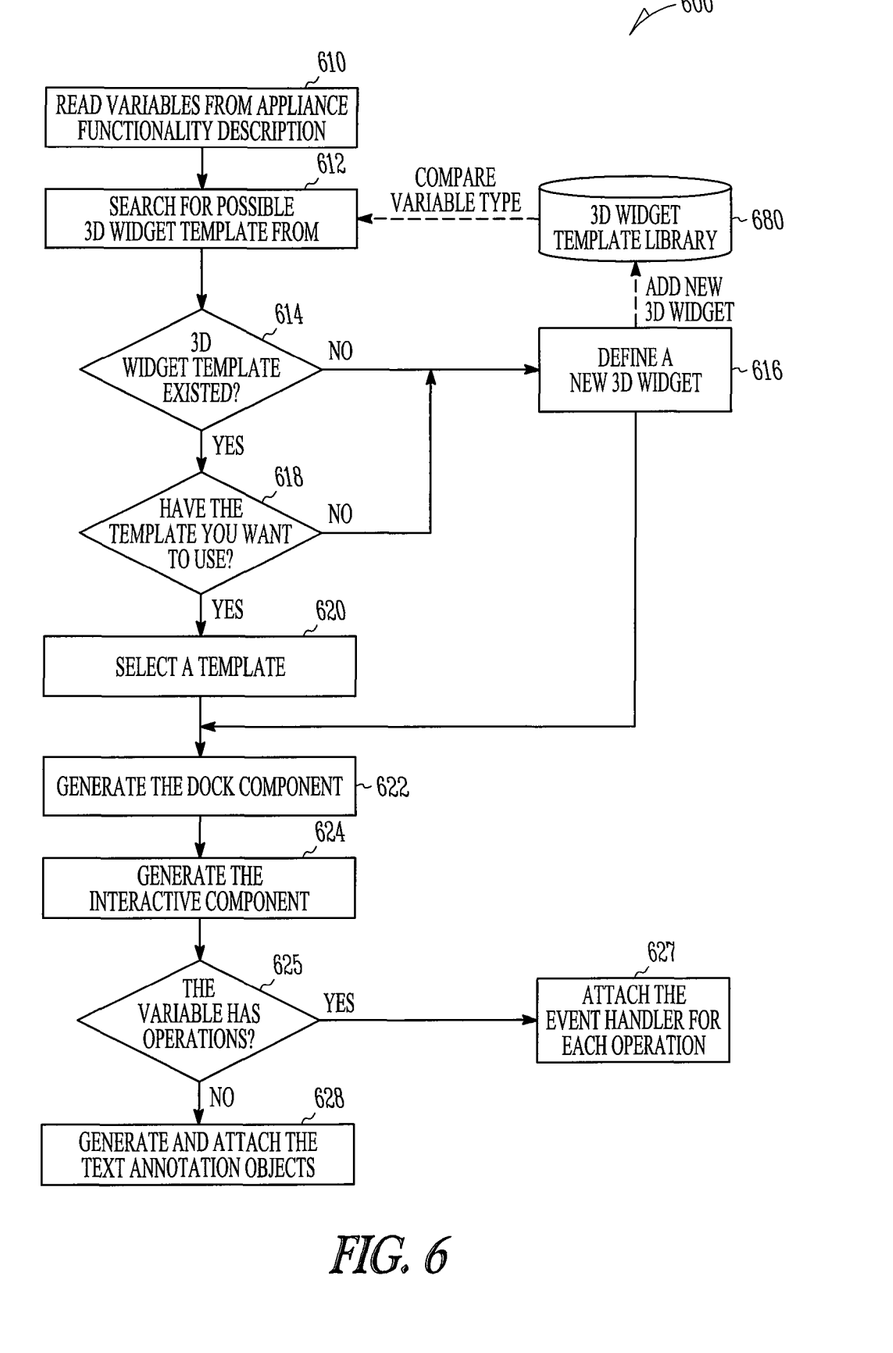
FIG. 6 is a diagram illustrating various methods of generating a 3D user interface in a controller for an appliance in a physical environment according to another example embodiment.

FIG. 6 illustrates various methods of generating a 3D user interface in a controller for an appliance in a physical environment according to another example embodiment.

For example, at block 610, state variables of the appliance from an appliance functionality description are read. The appliance functionality description may further include operations of the state variables and relationship among the state variables.

At block 612, a 3D widget template library 680 is searched to select a possible 3D widget template for each state variable according to the state variable type, for example, by comparing the type of each state variable with each 3D widget template within the 3D widget template library 680. The 3D widget template defines the geometric model and behavior of the 3D widget. Table 2 illustrates two example 3D widget templates for Integer and Enum variables.

TABLE 2

| Type: Integer |
|---|
| Condition:<br>    Area(x, y, width, height) && width is approximate to height<br>Modeling:<br>    DockComponent<br>        Extrude(circle(x, y, width/2), (0, 0, 0.5))<br>    InteractiveComponent<br>        Translation(Extrude(circle(x, y, width/3), (0, 0, 0.5), (0, 0, 0.5))<br>    TextAnnotation<br>        Attach(name, OnTop__Area)<br>        Attach(range, Along__Halfof__InteractiveComponent)<br>Behavior<br>    InteractionComponent: Rotation Around Center |
| Type: Enum |
| Condition:<br>    Area(x, y, width, height) && width is different to height<br>Modeling:<br>    DockComponent<br>        Extrude(rectangle(x, y, width, height), (0, 0, 0.5))<br>    InteractiveComponent<br>        Extrude(Cube(x, y, min(width, height)), (0, 0, 0.5))<br>    TextAnnotation<br>        Attach(name, OnTop__Area)<br>        Attach(range, Along__longEdge)<br>Behavior<br>    InteractionComponent: Translation Along longEdge |

At block 614, it is determined whether possible 3D widget templates exist. If no possible 3D widget templates exist, at block 616, a 3D widget template is drawn by a graphics designer using for example a geometric model authoring tool, and added into the 3D widget template library 680.

At block 618, if more than one possible 3D widget templates exist, it is determined whether there is any 3D widget template to his interest. Further, at block 616, if no interesting 3D widget template exists, a 3D widget template is drawn and added into the 3D widget template library 680. Otherwise, at block 620, if more than one interesting 3D widget templates exist, one 3D widget template is selected from the more than one interesting 3D widget templates. In this way, the embodiment provides an efficient way to reuse the work done by graphics designers.

Then, at block 622, a 3D dock component is generated to hold a 3D interactive component. At block 624, the interactive component is generated to be placed into the 3D dock component. At block 628, text annotation objects are generated and attached to the 3D interactive component and the 3D dock component to form a background of the 3D interactive component.

In some embodiments, at block 625, each state variable is checked to determine whether the state variable has an operation. If yes, at block 627, attaching an event handler to the operation to deal with any interactions with the corresponding widget.

Figure 7:
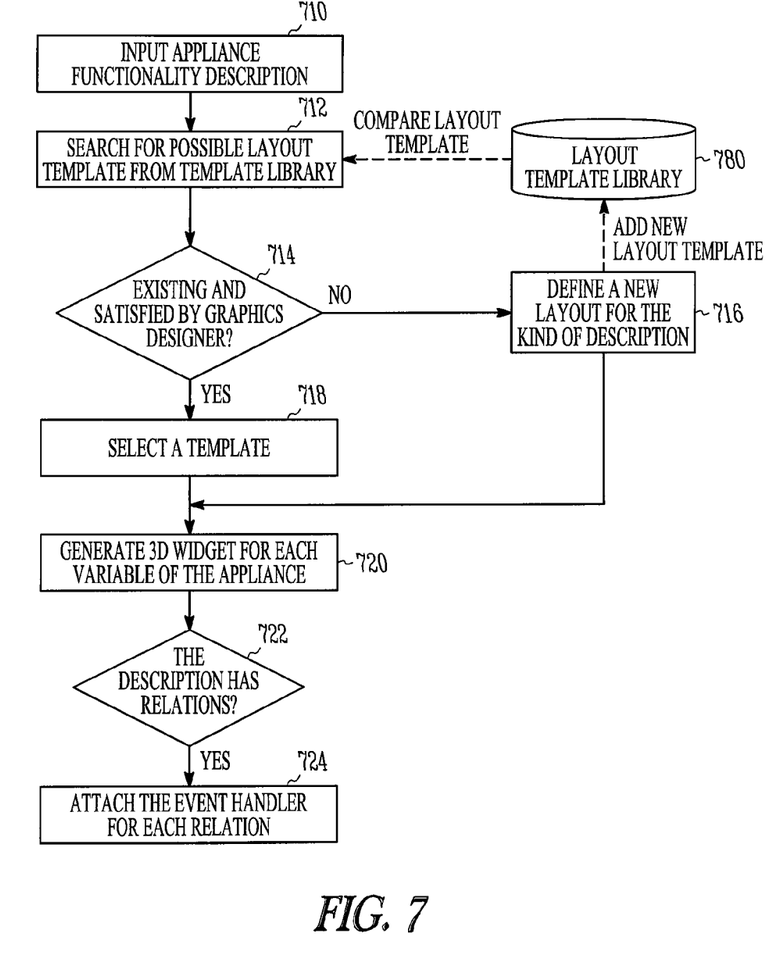
FIG. 7 is a diagram illustrating a method of laying out a 3D user interface in a controller for an appliance in a physical environment according to an example embodiment.

FIG. 7 illustrates various methods 700 of laying out a 3D user interface in a controller for an appliance in a physical environment according to an example embodiment.

For example, at block 710, an appliance functionality description is input. The appliance functionality description includes state variables of the appliance 110, operations of the state variables, and relationship among the state variables.

At block 712, a search is done for a similar 3D widget layout template from a widget layout template library 780 by comparing the types of the state variables with each 3D widget layout template of the 3D widget layout template library.

At block 714, it is determined whether a satisfied 3D widget layout template exists. If no satisfied 3D widget layout template exists, at block 716, a graphics designer may provide or draw a new 3D widget layout, and add it into the 3D widget layout template library 680. Otherwise, at block 718, if more than one satisfied 3D widget layout templates exist, the user may select one 3D widget layout template that best matches the types of the state variables of the appliance.

At block 720, a 3D widget is generated for each variable of the appliance. In this way, the embodiment provides an efficient way to reuse the work, which has been completed by graphics designers.

In some embodiments, at block 722, each state variable is checked to determine whether the state variable has any relationship with another state variable. If yes, at block 724, an event handler is attached for each relationship of the state variable.

Figure 8:
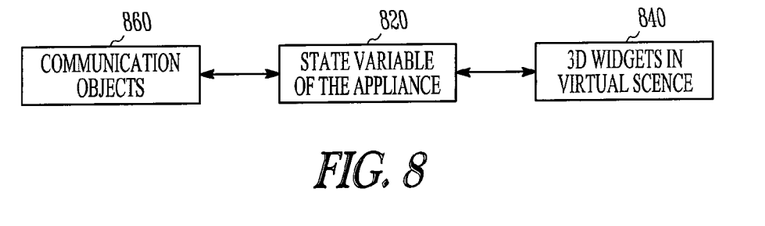
FIG. 8 is a diagram illustrating interactions between 3D widgets and physical appliances according to an example embodiment.

FIG. 8 illustrates interactions between 3D widgets and physical appliances according to an example embodiment. As shown in FIG. 8, the state variables 820 can be converted into 3D widgets 840, and can also be mapped into the communication objects 860. Thus, the interaction with the 3D widgets 860 in a virtual scene may change the state variables 820, may in turn change the communication objects 860, and may finally cause an action of the appliance in the physical environment via a communication protocol integrated with the appliance. Vice versa, any action on the appliance in the physical environment may change the communication objects via communication protocol, may in turn change the state variables, and may finally cause change the 3D widgets in the virtual scene.

In the prototype implementation, BACNet [BACNet 2003] can be used as the communication protocol to exchange information between virtual 3D scene and physical environment, and thus appliances will be modeled as BACNet devices. BACNet defines a set of standard object types. These object types define an abstract data structure that provides a framework for building the application layer services. The application layer services are designed, in part, to access and manipulate the properties of these standard object types. A BACNet device is made up of a set of objects. All objects are referenced by their Object Identifier property.

Each object within a single BACnet Device shall have a unique value for the Object Identifier property. When combined with the system-wide unique Object Identifier of the BACnet Device, this provides a mechanism for referencing every object in the control system network. There are two types of interoperations between a virtual widget in the 3D scene and an appliance in the physical environment:

(1). User manipulates the 3D widgets. Once the 3D widget is created, it can be manipulated and viewed remotely as an acting interface of the corresponding state variable of the real appliance. If the user manipulates the interface in the 3D scene, the communication protocol is able to forward the users' action to drive the corresponding appliance. If a user for example changes any 3D widget in the 3D scene, the corresponding state variable will be updated, and the physical device will be further updated by the protocol. To take the 3D widget of a HVAC system as an example, when the user wants to raise the temperature, he may first turn on the power widget of the HVAC interface (if the device is power off), which will modify the temperature state variable. Then, the user may move the temperature slider to the higher side to raise the temperature of the real HVAC system and the corresponding 3D UI will be updated accordingly.

(2). User manipulates the appliances. In a physical environment, there may be more than one appliances. When sensors or artifacts in the physical environment change, the communication protocol will notify the controller or the 3D display system to change the corresponding state variables in the State Variables List. Then the controller will update the virtual objects in 3D scene and its corresponding 3D widgets.

Further discussion about the communication between the 3D display system and the appliance under BACNet protocol is shown as follows.

Regarding the update of the existence of the appliance: A BACNet device is made up of a set of objects, within which there is exactly one object called device object which defines a standardized object, whose properties represent the externally visible characteristics of a BACnet Device. A Device object is referenced by its Object Identifier property, which is unique not only to the BACnet Device that maintains this object but also throughout the BACnet internet. When a BACNet Device is connected to the internet or receive a "Who-Is" service request, it will send an "I-Am" service request with its Object Identifier to notify its existence throughout the internet.

Regarding the update of the State Variable List from BACNet device: After receiving the "I-Am" request from a device, the 3D display system will send a "Read Property" request to read the object list of that physical device. Then the physical device will answer the request by send back its object list. The 3D display system will update the State Variable List. When a certain object of a BACnet device is changed, it will send an "UnconfirmedCOVNotification" service request to notify the 3D display system to update the State Variable List.

Regarding the update of a device's objects from State Variable List: When a state variable is changed, the 3D display system will send a "Write Property" service request to the BACNet device to change the corresponding object.

While there has been described herein the principles of the application, it is to be understood by those skilled in the art that this description is made only by way of example and not as a limitation to the scope of the application. Accordingly, it is intended by the appended claims, to cover all modifications of the application which fall within the true spirit and scope of the application.

The invention claimed is:

1. A system of automatically generating a 3D user interface (UI) for an appliance in a physical environment, comprising:
   a functionality specification abstracted from the appliance; and
   a controller coupled to the appliance comprising:
      a functionality analyzer to analyze the functionality specification to extract state variables of the appliance, operations of the state variables, and relationships among the state variables;
      a 3D widget generator to automatically convert the state variables into corresponding 3D widgets;
      a 3D UI generation module to generate the 3D UI using the 3D widgets in the controller; and
      a communication object manager to construct communication objects from the state variables in the controller, wherein the state variables are mapped into the communication objects.

2. The system of claim 1, wherein a communication protocol is integrated with the appliance to provide interaction between the 3D UI in the controller when displayed on a display device and the appliance in the physical environment via the communication objects.

3. The system of claim 1, wherein the controller further comprising:
   a state variable manager applicable to capture any interaction of a user with the 3D widgets, and to update the corresponding state variables by the operations thereof.

4. The system of claim 3, wherein the state variable manager is applicable to capture any update of the communication objects resulted from an action to the appliance, and to update the state variables by the operations thereof.

5. The system of claim 1, wherein the controller further comprises a 3D virtual device delegate module to capture any update of the state variables of the appliance and in turn to update corresponding 3D virtual device.

6. The system of claim 1, wherein the controller further comprising:
   a 3D UI layout module to layout the 3D widgets and display the 3D widgets on a display device separate from the appliance.

7. A method of generating a 3D user interface (UI) in a controller for an appliance in a physical environment, comprising:
   abstracting the appliance to obtain to an appliance functionality description having variables of the appliance, operations of the state variables, and relationship among the state variables;
   converting the state variables into corresponding 3D widgets in the controller, wherein the state variable are mapped respectively into the 3D widgets;
   laying out the 3D widgets to form the 3D UI in the controller;

constructing communication objects in the controller from the state variables, the state variables being mapped into the communication objects; and providing interaction between the 3D UI and the appliance by a communication protocol integrated with the appliance.

8. The method of claim 7, wherein providing interaction between the 3D UI and the appliance by a communication protocol integrated with the appliance comprising:

when a first operation is applied to the 3D UI, updating the state variables of the appliance and in turn the communication objects of the appliance; and activating a first action on the appliance in the physical environment via the communication protocol.

9. The method of claim 7, wherein providing interaction between the 3D UI and the appliance by a communication protocol integrated with the appliance comprising:

when a second action is applied to the appliance, updating the communication objects via the communication protocol and in turn the state variables of the appliance; and presenting the second action on the corresponding 3D widget.

10. The method of claim 7, wherein abstracting the appliance to obtain an appliance functionality description comprises:

assigning default values and valid value ranges to the state variables of the appliance.

11. The method of claim 7, further comprising:

attaching event handlers to the operations of the state variables to deal with interactions with the corresponding widgets.

12. A method of generating a 3D user interface (UI) in a controller for an appliance in a physical environment, comprising:

reading state variables of the appliance from an appliance functionality description, which further includes operations of the state variables and relationship among the state variables;

searching a 3D widget template library to select a 3D widget template for each state variable as a function of its variable type; and generating a widget for each state variable by using the selected matching 3D widget template.

13. The method of claim 12, wherein generating a widget for each state variable by using the selected matching 3D widget template comprises:

generating an interactive component for the widget, to which an interaction is applicable to operate the appliance, wherein the 3D widget template defines geometric model and behavior of the correspond state variable.

14. The method of claim 12, wherein generating a widget for each state variable by using the selected matching 3D widget template comprises:

generating a dock component and a text annotation for the widget, to form a background of the interactive component of the widget.

15. The method of claim 12, further comprising:

defining and adding a new 3D widget template into the 3D widget template library, if no 3D widget template is selected in the 3D widget template library.

16. The method of claim 12, wherein searching a 3D widget template library to select a 3D widget template for each state variable as a function of its variable type comprises:

comparing the type of each state variable to each 3D widget template within the 3D widget template library.

17. The method of claim 12, further comprising:

if the state variables have operations, attaching event handlers to the operations of the state variables to deal with interactions with the corresponding widgets.

18. A method of laying out a 3D user interface (UI) in a controller for an appliance in a physical environment, comprising:

receiving an appliance functionality description including state variables of the appliance, operations of the state variables, and relationship among the state variables;

searching a 3D widget layout template library to select a 3D widget layout template as a function of the type of each state variable of the appliance;

generating a 3D widget for each state variable of the appliance by a 3D widget modeling system; and laying out the generated 3D widgets based on the selected 3D widget layout template.

19. The method of claim 18, wherein searching a 3D widget layout template library to select a 3D widget layout template as a function of the type of each state variable of the appliance comprises:

comparing the type of each state variable with each 3D widget layout template within the 3D widget layout template library.

20. The method of claim 18, further comprising:

if the state variables have operations, attaching event handlers to the operations of the state variables of the appliance to deal with interactions with the corresponding 3D widgets.

* * * * *